July 3, 1945.  E. L. FISCHER  2,379,698
CAMERA AND RANGE FINDER
Filed Nov. 14, 1940
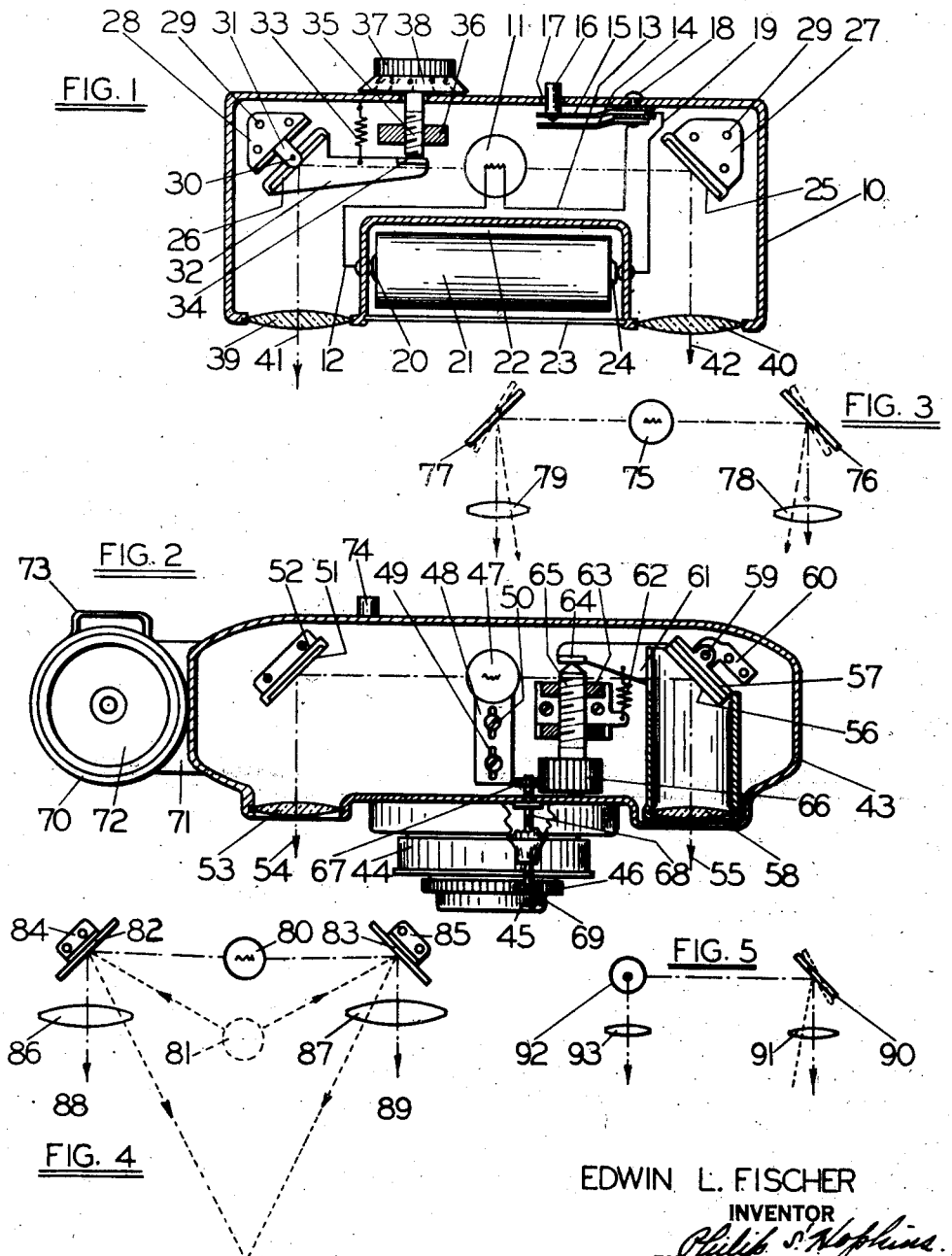
EDWIN L. FISCHER
INVENTOR
BY Philip S. Hopkins
William C. Babcock
ATTORNEYS Patented July 3, 1945

2,379,698

UNITED STATES PATENT OFFICE 2,379,698

CAMERA AND RANGE FINDER

Edwin L. Fischer, Endwell, N. Y., assignor to General Aniline & Film Corporation, New York, N. Y., a corporation of Delaware Application November 14, 1940, Serial No. 365,662

2 Claims. (Cl. 95—44)

This application concerns a camera and range finder construction which is especially suitable for use at night or in dim light.

The ordinary optical range finder is well known in the prior art and has been built into camera constructions in various ways. These range finders, however, are difficult to use in extremely dim light and cannot be used at all in the dark. Various proposals have been made to avoid this difficulty. For example, devices have been suggested which employ a single beam of light which is focused on the object in question. Even with such a beam, however, it is difficult to determine whether the finder is accurately focused.

With these defects of the prior art range finders in view, it is accordingly one object of the present invention to provide a new type of range finder which can be employed easily in the dark or in dim light.

Another object is to provide a camera with a built-in or coupled range finder for use under adverse lighting conditions.

A still further object is to provide a range finder in which a plurality of separated beams may be superimposed on a given object to determine the distance of said object from the camera.

An additional object is to provide such a range finder of the plural beam type coupled with the focusing mechanism of a camera for automatic focusing of the latter.

Other objects and advantages of this invention will be apparent from the following specification and claims.

In the drawing, which forms a part of this application:

Figure 1 is a sectional top view of a separate range finder embodying this invention.

Figure 2 is a top view of a camera with a built-in range finder embodying the present invention, the cover of the camera removed; and Figures 3, 4, and 5 are schematic diagrams of different modifications of the invention.

In order that those persons skilled in the art may readily understand the nature and scope of this invention, the following detailed and concise description is given, with particular reference to the accompanying drawing, wherein like reference characters indicate like parts.

In Figure 1, the range finder comprises a casing 10 in which is mounted a bulb or light source 11. Bulb 11 is connected by wire 12 to one terminal 20 of a battery 21. This battery is carried in a chamber 22 which forms a part of the finder casing, and said chamber is provided with a cover plate 23 which can be removed for ready access to the battery or batteries. Lamp 11 is also connected by wire 13 to one terminal 14 of a suitable switch mechanism. Terminal 14 is fixed on a stud 18 mounted in the casing 10. A movable switch arm 15 is also mounted on said stud and is provided with a finger piece 16 which projects through an opening 17 in the casing. It is apparent that pressure on member 16 will close said switch.

The other or movable arm 15 of said switch is in turn connected by wire 19 to the second terminal 24 of the battery 21. It will be obvious that a plurality of batteries or cells can be employed. These cells are preferably of the type used in pen flash lights.

The light from bulb 11 is projected in the form of two axially separated beams 41 and 42 by suitable mirrors 25 and 26 and corresponding lenses 40 and 39. Mirror 25 is mounted on a bracket 27 fastened to the range finder casing by screws 29. This particular mirror is thus fixed with reference to said casing. Mirror 26, on the other hand, is rotatably mounted at 30 on the projecting arm 31 of bracket 28. Bracket 28 is also fixed to the casing by screws 29. The rotatable mirror 26 is provided with a control arm 32 which, together with the mirror, is urged in a counterclockwise direction (in Figure 1) by a spring 33 connected to said arm and to the casing as shown. Spring 33 thus urges the end of arm 32 toward the casing wall so that flange 34 on arm 32 is held in contact with the end of adjusting screw 35. Adjusting screw 35 is mounted in bracket 36 carried by the casing, and moves back and forth in said bracket as the screw is rotated by control knob 37. Knob 37 has a scale 38 to indicate the range of a particular object, as explained below.

It will be apparent that rotation of knob 37 and screw 35 will move the lug 34, arm 32 and mirror 26. As the mirror is rotated, light beam 41 which is reflected by this mirror will be deflected toward or away from fixed beam 42. Thus it is possible, by rotation of knob 37, to make beams 41 and 42 coincide on a given object. Scale 38 is so calibrated that it will register the particular distance of an object from the user, whenever the beams 41 and 42 are superimposed on that particular object.

In Figure 2, I have shown a camera construction in which a range finder similar to that of Figure 1 has been incorporated. The range finder is coupled to the focusing mechanism of the camera. The camera includes a body 43, a shutter casing 44, and a lens-carrying member 45. The lens may be moved along its optical axis to focus the camera for different object distances by means of the knurled focusing ring 46 which is rotatable around the lens carrier. This focusing ring 46 is rotated by the fingers of the operator to secure the necessary adjustment of the lens.

In the camera body is mounted a lamp 47 which serves as the source of light for the range finder. Lamp 47 is carried on a bracket 48 provided with slots 49 through which the screws 50, connecting the bracket to the casing, may pass. Because of the slot arrangement it is possible to move the lamp slightly in order to adjust the projected beams 54 and 55 to any necessary extent. Beam 54 is produced by means of fixed mirror 51, carried on bracket 52, which reflects the light from bulb 47 through fixed lens 53. The second beam 55 is reflected from bulb 47 by mirror 56 through lens 58. Mirror 56 is carried by the movable bracket 57, which in turn is rotatably mounted at 59 on bracket 60 fastened to the camera casing. The movable bracket 57 is further provided with the control arm 61 which is urged in a counter-clockwise direction by spring 62. One end of spring 62 is fastened to said arm 61, and the other end of spring 62 is connected to a bearing member or bracket 63 in the camera body.

The action of spring 62 urges arm 61 and its flange 64 in a downward direction in the drawing. Thus flange 64 is held against the end of screw 65, which is carried in bracket 63 in a manner similar to that described for screw 35 and bracket 36 of Figure 1. Thus rotation of screw 65 moves the arm 61 and mirror 56 to deflect beam 55 and permit beams 54 and 55 to be superimposed on a given object. It should be noted that lens 58 is mounted in a tubular extension connected to bracket 57 and mirror 56. The lens thus moves and tends to remain in the path of beam 58 as the mirror is rotated. Actually beam 55 is deflected through an angle twice as great as the angle of rotation of the mirror and lens and will not remain exactly coaxial with lens 58 in the construction shown. Within the range of deflections required, however, this discrepancy does not become serious. The error could, of course, be completely avoided by connecting lens 58 and mirror 56 or screw 65 in such a way that the lens would be rotated twice as far as the mirror in a given adjustment.

Screw 65 is provided with a wide gear 66, which is driven by a smaller gear 67 on shaft 68. Shaft 68 projects through the front of the camera casing and carries another gear member 69 which meshes directly or through an intermediate gear with the knurled focusing ring 46. Thus, as the focusing ring is rotated by the operator, shaft 68 will also be rotated and will drive screw 65 to move mirror 56 and lens 58 as described.

By a suitable choice of gearing, it will be readily understood that the focusing of the camera lens and the deflection of beam 55 can be synchronized so that the lens will be focused on a given object whenever the light beams 54 and 55 are superimposed on that object.

Bulb 47 may derive its current from a separate battery as in Figure 1, or it may, if desired, be connected to the batteries of a photoflash attachment of well-known type. The battery chamber of such an attachment is shown at 70 in Figure 2 and is connected to the camera by bracket 71. Casing 70, in turn, is provided with a socket 72 for the photoflash bulb and with the bracket 73 in which the usual reflector is mounted. A switch member or button 74 may be connected in circuit with bulb 47 and the batteries of said flash attachment by wiring similar to that shown in Figure 1. Thus the same batteries may furnish current for both the range finder and the flash bulb.

It will be obvious to those persons skilled in the art that equivalent forms of construction may be employed in accordance with the present invention. Figures 3, 4, and 5 show three different variations of my basic idea. Thus, in Figure 3, the light from bulb 75 is projected in the form of two separate beams by mirrors 76 and 77 and corresponding lenses 78 and 79. Instead of a single adjustable mirror as in Figures 1 and 2, the device of Figure 3 has two movable mirrors to achieve the same result. Both lenses may also be adjustable. The particular means employed for the rotation of these mirrors may be similar to that shown in Figures 1 and 2, or any other equivalent form of construction may be used.

In Figure 4 the light source or bulb 80 is movable in a direction which is substantially perpendicular to a line connecting the mirrors 82 and 83 and also substantially parallel to the finally projected beams 88 and 89. Mirrors 82 and 83 are carried on brackets 84 and 85 which are both fixed with respect to the casing of the range finder or camera. The light beams which are reflected by the mirrors through lenses 86 and 87 may be deflected to achieve the results of this invention by movement of the light source 80 between its heavy line position and the dotted line position shown at 81. Movement of the light source is controlled by means similar to those used for the mirrors of Figures 1 and 2.

In Figure 5 a different modification has been shown which employs only one mirror 90. The light from bulb 92, according to this figure, is reflected by the movable mirror 90 through the lens 91. A second lens 93 projects a fixed beam of light directly from bulb 92 without the insertion of any reflecting means between said bulb and lens. It is also clear that two separate light sources could be used and that movable wedges could be employed in place of the rotatable mirrors to deflect at least one beam. Since other equivalent forms of construction will be readily apparent to anyone skilled in the art, it is not my intention to limit this invention to the precise mechanical embodiment shown in the drawing. The invention should be interpreted broadly within the spirit and scope of the attached claims.

Now therefore I claim:

1. A photographic camera having in combination, a casing, an objective and mounting therefor, said mounting being rotatable for moving the objective axially of the mounting for focusing it, a range finder attached to said casing and having a source of light, two mirrors and a cooperating lens for each mirror, one of said mirrors being fixed to reflect a beam from the light through its lens and parallel to the extension of the objective, the other mirror being pivoted so that light reflected thereby may be caused to project through its lens and in a direction parallel to the first-mentioned beam or inclined at an angle thereto, means for swinging said movable mirror including an arm, a spring and an adjusting screw having a gear fixed thereto, a shaft projecting from said range finder and having a pinion meshing with said gear and also being connected for rotation with the objective mounting, the construction and operation being such that as the objective is focused, the movable mirror will be swung about its pivot to reflect its beam of light so as to intersect the beam of light from the fixed mirror at substantially that point for which the objective is focused.

2. A photographic camera having in combination, a casing, an objective, and a rotary mount for said objective, said rotary mount being movable throughout a predetermined angular extent for focusing the objective, a range finder constructed as an integral part of said camera and including two mirrors, one of which is fixed in position and the other of which is angularly movable, a source of light intermediate the said mirrors and lenses in said casing through each of which a beam of light reflected by one the said mirrors is projected, an arm for swinging said movable mirror and means for converting the focusing movement of the objective into an angular movement of said mirror, including a rotary element geared to the objective mount and an axially movable threaded extension engageable with the said arm.

EDWIN L. FISCHER.